Dec. 5, 1944.　　　A. R. OAKES　　　2,364,384
BUFFING LATHE FOR VEHICLE TIRES
Filed March 19, 1941　　　3 Sheets-Sheet 1

INVENTOR.
Arthur R. Oakes
BY Joseph F. Westall
ATTORNEY

Dec. 5, 1944.    A. R. OAKES    2,364,384
BUFFING LATHE FOR VEHICLE TIRES
Filed March 19, 1941    3 Sheets-Sheet 2
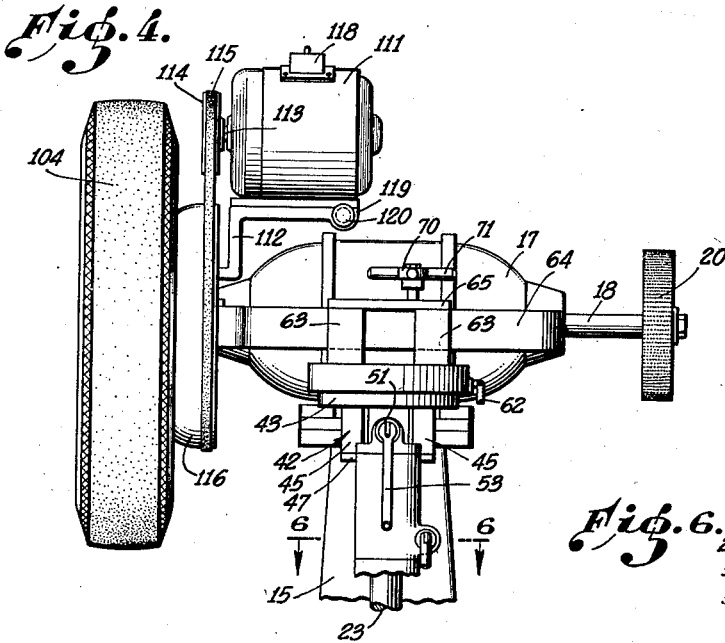
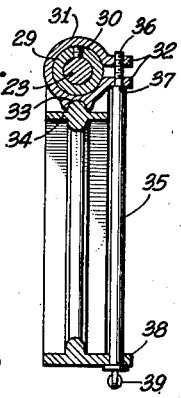
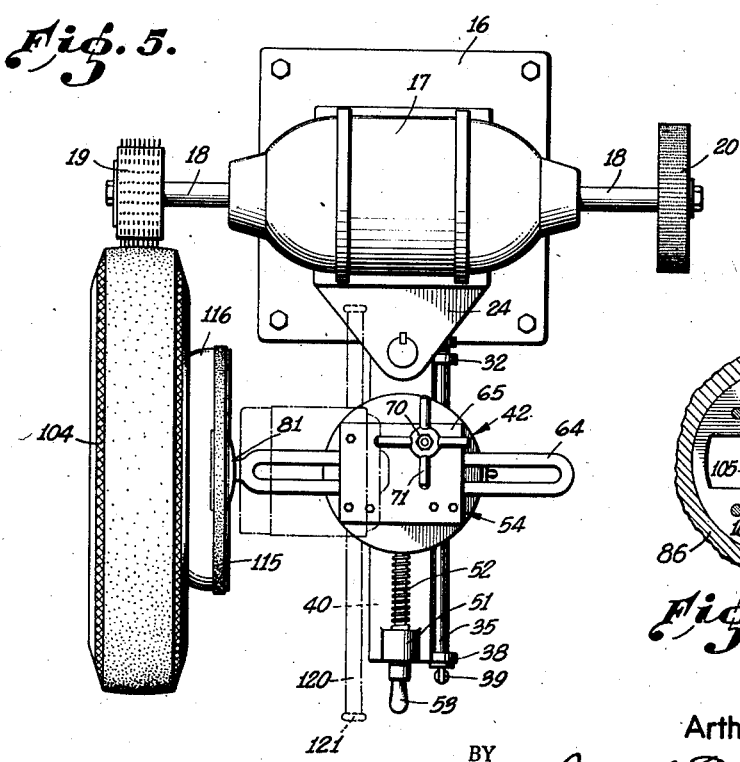
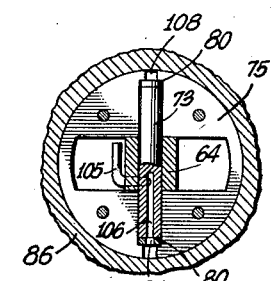
INVENTOR.
Arthur R. Oakes
BY Joseph F. Westall
ATTORNEY Dec. 5, 1944.  A. R. OAKES  2,364,384
BUFFING LATHE FOR VEHICLE TIRES
Filed March 19, 1941  3 Sheets-Sheet 3
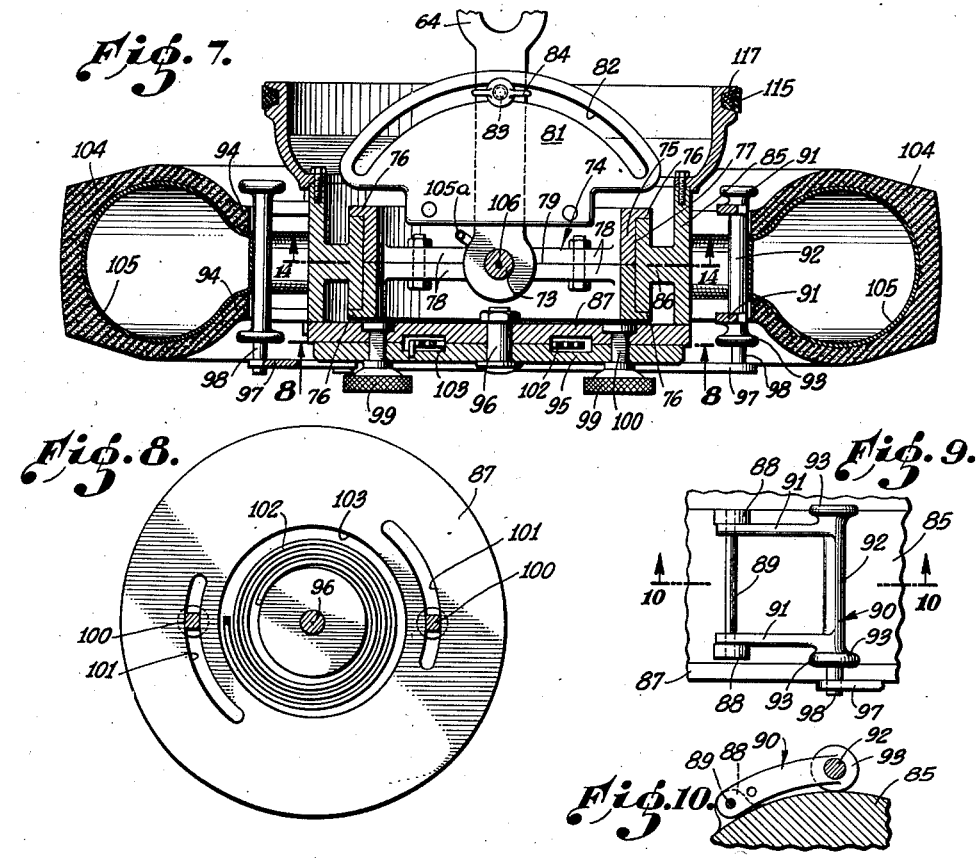
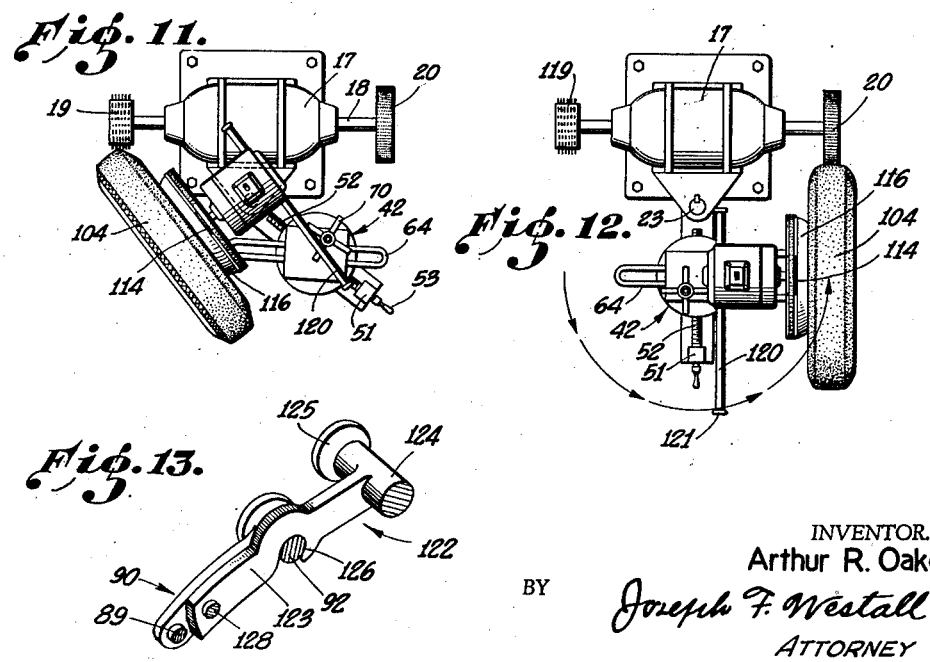
INVENTOR.
Arthur R. Oakes
BY Joseph F. Westall
ATTORNEY

Patented Dec. 5, 1944

2,364,384

UNITED STATES PATENT OFFICE 2,364,384

BUFFING LATHE FOR VEHICLE TIRES

Arthur R. Oakes, Monrovia, Calif., assignor to
Jesse F. Brown, Los Angeles, Calif.

Application March 19, 1941, Serial No. 384,126

7 Claims. (Cl. 29—76)

This invention relates to buffing lathes, and more specifically contemplates structures adapted to pivotally mount vehicle tires, whereby a tire may be swung with a minimum of effort and positive balanced control relative to a pair of buffing elements for selective treatment thereby of any area of the wall or tread of the tire.

It is a general object of the invention to provide a rotatable mounting for tires to be prepared for vulcanization, by which a tire thus carried may be moved into contact with a motor-actuated rasp, brush, tool or the like for buffing selected portions of the tread or either side wall of the tire, or for treating the entire periphery of the tire while the latter is rotated, to form a base for retreading or recapping of any desired contour.

Another object is the provision of tire supporting apparatus comprising a series of pivoted extensible sections adapted for arcuate movement on their respective pivots which are arranged, when the sections are in the center of their arcuate movement, in a single plane intermediate and equi-spaced from parallel planes through the buffing elements, so as to utilize the maximum range of movement available for the presentation of either side wall or any intermediate portion of the tread to either of the buffing elements, as well as to each thereof successively, with equal facility.

Another object is to provide means for rotating the buffing elements at high speed in a downward direction at the point of their contact with the tire, and turning the tire more slowly either in the same or in the opposite direction so as to insure uniformity of contour in the finished product and enable observation of the effect of the buffer during the operation Another object is to provide means for securing pairs of the pivotally jointed sections of the supporting apparatus against angular variation whereby a series of tires of the same dimensions may be brought into contact with either the buffing elements from the same angle to facilitate identical treatment of all tires of the series.

Another object is to embody in the supporting apparatus two or more extensible sections for varying, by the extension or retraction of said sections, the lengths and radius of the arcs of movement of each section pivoted thereto, respectively, to augment the adaptability of the apparatus to tires of various diameters and increase the degree of the angles which may be formed between the tires and the buffing elements.

Another object is to provide a tire chuck comprising a rotatable rim on which tires may be removably mounted, carrying a plurality of members pivoted thereto and adapted for extension either manually or in response to the urge of resilient means incorporated therewith, into engagement with the beads of a tire mounted thereon so as to center and support tires of various rim diameters coaxially with the rim, including means to secure the centering mechanism in any desired retracted or extended relationship with the rim.

Another object is the provision of means to lubricate each of the bearings on which the rim is pivoted and rotatably carried, respectively, comprising means to direct oil, moving by gravity from a storage depositary to each of the bearings successively.

Other objects and salient features as, for example, the provision of means for varying the elevation of the tire supporting structure relative to the buffing elements, of a single member by which the tire may be swung throughout its range of movement for its adjustment relative to either of the buffing elements, as well as ease of operation, and simplicity of construction and durability, will be apparent to those of skill in the art to which my invention appertains upon an examination of the following description read in the light of the accompanying drawings, in which—

Fig. 4 is a view in elevation of the upper structure, illustrating the same adjustment of the apparatus as, but taken at right angles to, the view of Fig. 1;

Fig. 5 is a top view of the embodiment as illustrated in Fig. 4;

Fig. 6 is an enlarged view in section and elevation, taken on lines 6—6 of Fig. 4, of the post on which the tire-supporting mechanism is pivotally mounted and the clamping means for fixing the adjustment of this mechanism;

Fig. 7 is a sectional view taken on lines 7—7 of Fig. 1, of the tire-supporting hub and associated mechanism;

Fig. 8 is a sectional view taken on lines 8—8 of Fig. 7;

Fig. 9 is a broken elevation of the exterior of the tire rim, showing one of the series of centering devices for the tire;

Fig. 10 is a broken sectional view taken on lines 10—10 of Fig. 9, illustrating particularly the arcuate design of the centering devices;

Figs. 11 and 12 are top views illustrating two of the many positions to which the tire may be swung with relation to the buffing elements;

Fig. 13 is a perspective view of an attachment used in conjunction with the tire-centering devices carried by the rim for the purpose of accommodating tires of the larger sizes;

Fig. 14 is a broken sectional view taken on lines 14—14 of Fig. 7 of the bearings for the tire-carrying hub and the lubricating means therefor.

Figure 1:
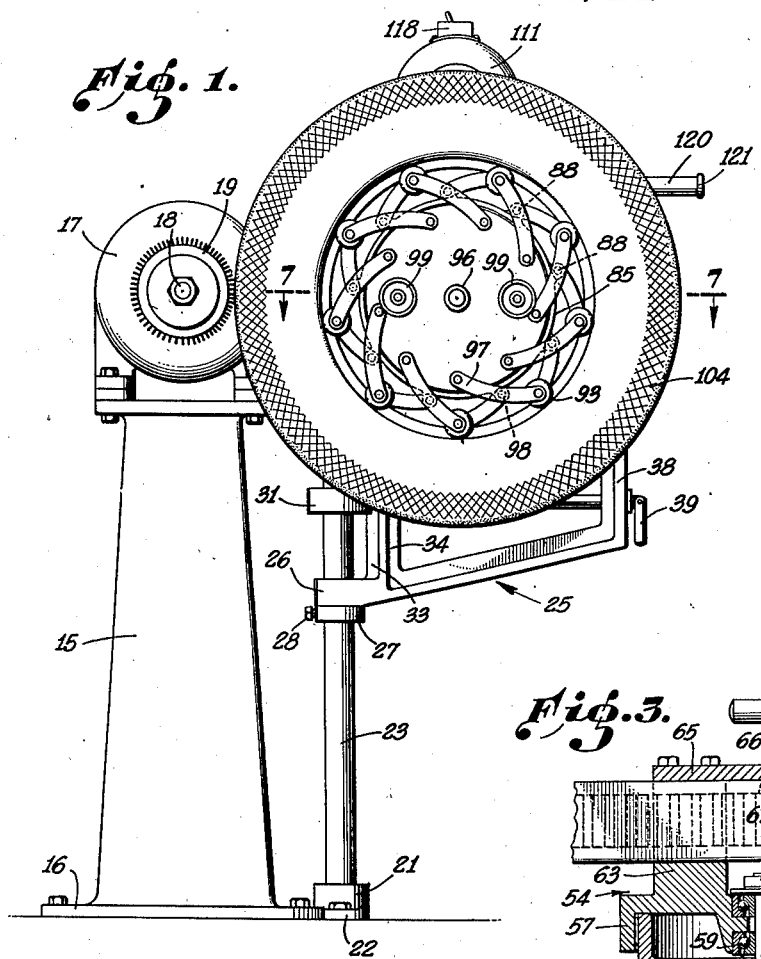
Fig. 1 is a side elevation of apparatus comprising one embodiment of my invention, indicating the relative position of principal parts thereof when utilized for rasping the center tread of a tire carried thereby.

Referring to the drawings more in detail, the numerals of which indicate like parts throughout the several views, 15 designates generally a standard having a flanged bottom 16 adapted to be bolted or otherwise secured to a floor. The standard 15 supports a motor 17 having a horizontal shaft 18 on opposite ends of which are mounted a steel rasp 19 and circular brush 20, respectively, which are adapted to be turned by motor 17 at high speed, and against which tires may be moved by the apparatus hereinafter described, to circularize, roughen and clean a tire to be retreaded or recapped. The brush 20 and rasp 19 as well as the means for turning and supporting the same are of conventional construction and form a part of the present invention only insofar as they are elements of the mechanical combinations hereinafter claimed.

A retaining block 21 is secured to the floor in abutting relation to the flanged bottom 16 and preferably on a radius of standard 15 forming a right angle with the motor shaft 18, by bolts extending through ears 22 integral with opposite sides of the block. The lower end of a vertical post 23 is mounted in block 21 and the upper end of post 23 extends through a lug 24 secured to the top of the motor standard.

A cast supporting frame 25 is formed at one side thereof with a pair of spaced bearings 26 through which post 23 extends for pivoting the frame thereon. A collar 27 encircles the post beneath the lowermost bearing 26 and is secured against longitudinal movement thereof by a set screw 28, for the support of the frame 25. By varying the position of the collar 27 on post 23 the elevation of frame 25 and mechanism supported thereby, hereinafter described, relative to the buffing elements 19 and 20, may be changed to meet specific requirements.

The supporting frame 25 may be secured against arcuate movement on post 23 by means of a clamping device illustrated in Fig. 6. A bearing collar 29 encircles the post intermediate the bearings 26 of the frame and is secured thereto against rotative or axial movement by a countersunk set screw 30. A split collar 31, having laterally projecting perforated ears 32 at opposite sides of the split therein, is arranged on the collar 29. Collar 31 is keyed to the frame 25 so as to prevent independent arcuate movement therebetween by the projection of a rib 33 integral with the adjacent vertically disposed bar 34 of the frame into a recess in collar 31. The split collar is tightened on the collar 29 by a rod 35 having a diametrically-reduced end portion 36, journalled in and extending through one of the ears 32 of the collar 31 against which the shoulder 37, formed by the reduction in diameter of rod 35, abuts, said end portion 36 being threaded into the opposite ear 32. The rearward end of rod 35 is journalled in a lug 38 integrally cast with the opposite side of frame 25 and is provided with a pivoted handle 39 to facilitate rotation of the rod so as to draw the threaded ear 32 of collar 31 toward the opposite ear held firmly by shoulder 37 and adjacent rib 33, and thereby clamp the split collar 31 tightly onto collar 29 to prevent relative rotation therebetween.

Figure 3:
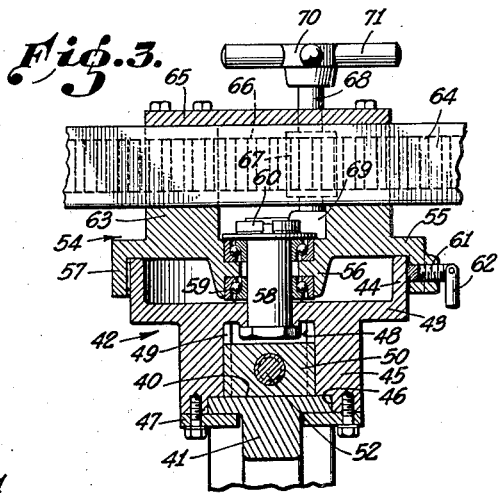
Fig. 3 is a broken sectional view, taken on lines 3—3 of Fig. 2, of the central bearing and associated mechanism in which the laterally-projecting tire-carrying arm, shown in elevation, is slidably and pivotally supported.
Figure 2:
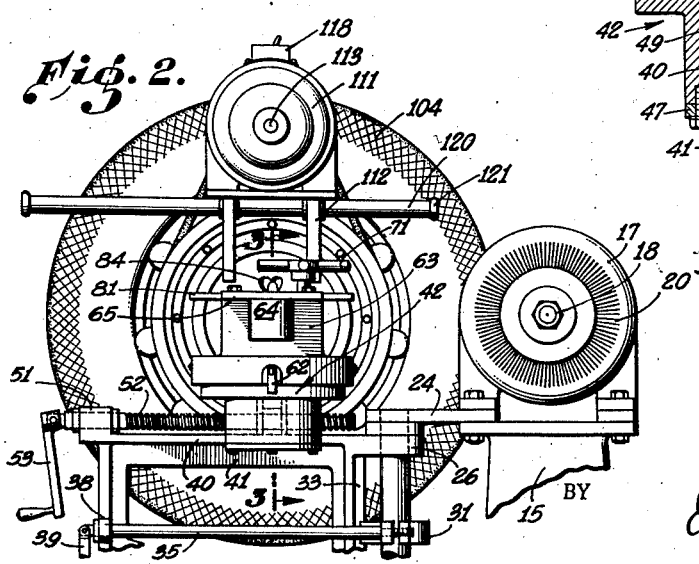
Fig. 2 is an elevation, partially broken away, taken from the opposite side of the device from the view of Fig. 1.

The upper surface 40 of the top bar 41 of supporting frame 25 is flat for the slidable support of a pivot block 42, best illustrated in Fig. 3. Block 42 consists of a circular member 43 having an upwardly-directed peripheral flange 44 integral therewith. The underside of member 43 is formed with a pair of integral spaced legs 45 having a portion of their lower edges cut away as at 46 to provide surfaces adapted to bear against and slide upon the surface 40 of bar 41 of the supporting frame. Inwardly-directed retaining plates 47 are secured by suitable means to the lower edges of legs 45 to engage the underside of bar 41 of the cast frame and prevent displacement of the block 42 during operation of the apparatus. The inner opposing faces 48 of legs 45 above bar 41 are formed with vertical ribs 49 to engage in complementary recesses of an actuating block 50 disposed between the legs and supported on the surface 40 of the bar. The block 50 is formed with a threaded opening which extends axially therethrough parallel to the bar 41. A journal box 51 is carried on the outer swinging end of the bar 41 for the rotative support of a screw 52, threaded through the opening in block 50. Incorporated in the box 51 is conventional means for preventing longitudinal movement of screw 52. A handle 53 is pivoted to the end of the screw to rotate the latter and thereby move the pivot block 42 longitudinally of the bar.

The block 42 is adapted to form the support for a rotatable member 54 comprising a disc 55 having a central downwardly-directed boss 56 and a peripheral flange 57 which normally encompasses the flange 44 of the pivot block 42 over which it is arranged. A pin 58 extends upwardly through the center of disc 55 and through bearings 59 housed in an opening formed in boss 56 to pivotally support and coaxially align the member 54 with the block. A ring 60 engages the upper end of pin 58 above the bearings 59 to retain member 54 and block 42 against relative displacement. The disc 55 will normally be in very close proximity with the upper edge of the peripheral flange 44 of the pivot block 42 so as to contact the same and thereby reinforce bearings 59 in response to excessive weight applied to one side or the other of member 54. Member 54 is thus normally free to rotate relative to block 42 to aid in securing proper adjustment of the apparatus as hereinafter more in detail described. A set screw 61 is threaded through the side of flange 57 of the upper member 54 to engage the flange 44 of the lower block and maintain rotative adjustment of the member and block with respect to one another when desired. A handle 62 is pivoted to the end of set screw 61 to facilitate its operation.

Integral with the top of the rotatable member 54 are four upstanding projections 63 forming between pairs thereof a slide-way for a slotted arm 64 movable longitudinally therethrough, by means about to be described.

A plate 65 is bolted or otherwise secured over the top of projections 63 to maintain arm 64 in the slide-way. An elongated recess is formed in one side of the arm for the accommodation of a rack 66 fitted and secured therein by suitable means, as by welding. Rack 66 is engaged by a pinion 67 carried on a shaft 68 having its lower end journalled in a boss 69 integral with the rotatable member 54. The upper end of the shaft 68 extends through plate 65 and has a hub 70 secured thereon. Radially extending handles 71 mounted in hub 70 facilitates rotation of shaft 68 and pinion 67 so as to shift rack 66 and arm 64 longitudinally in an obvious manner.

Through one end of arm 64 a transverse pin 73 extends by which a circular tire-carrying hub 74 is pivotally supported, as hereinafter described. The hub 74 comprises a pair of annular members 75, L-shaped in cross-section, which are arranged edge to edge with the flanges 76 thereof cooperating to form an annular channel 77 for a purpose later referred to. Within each member 75 is a pair of oppositely disposed integral segments 78, each of which, with hub 74 assembled, flatly engage a surface 79 of one of the segments of the other member. The abutting surfaces 79 of each pair of segments 78 of respective members 75 are formed with a central semi-circular recess. Each segment 78 of each member 75 is bolted to the abutting segment 78 of the other member 75 with the recesses therein registering with one another so as to form within hub 74 a pair of diametrically opposite bearings 80 for the ends of pin 73 on which arm 64 is journalled. It will thus be observed that hub 74 is pivoted to the arm with the axis of the pivot pin 73 lying in the central plane of the composite hub. To secure the hub and arm 64 in any desired angular relationship I provide a plate 81 overlying the portion of arm 64 adjacent the hub and mounted to the latter at opposite sides of pin 73 by any means. Plate 81 is formed with an arcuate slot 82, the arc having its center on the axis of pin 73. A bolt 83 secured to arm 64 extends upwardly through slot 82 in the plate. A winged nut 84 threaded on bolt 83 is adapted to clamp the plate 81 and arm 64 together and thereby secure the tire hub 74 and said arm in any adjusted relationship.

A rim 85 is rotatably mounted on hub 74 by means of an annular foot 86, T-shaped in cross-section and integral therewith, which is engaged in the channel 77 of the composite hub. A disk 87 of a diameter substantially the same as that of rim 85 is welded or otherwise secured to the outer edge of rim 85 for a purpose later alluded to.

Equi-spaced around rim 85 and preferably integral therewith are nine pairs of upstanding lugs 88, the lugs of each pair being arranged in alignment with one another transverse of the rim and at opposite side edges of the latter. A series of pins 89 having their ends mounted in lugs 88 respectively of each pair thereof, provide journals for tire centering members, generally designated by numeral 90. Each member 90 comprises a pair of legs 91 having one of their ends pivoted on the pins 89, respectively, with a transverse link 92 connecting the opposite ends of legs 91. The legs are preferably curved from their point of pivoting in an arc of the same degree as that of rim 85 in order that the links 92 may lie more closely to the periphery of the rim. At each end the links are diametrically enlarged as at 93 to engage the beads 94 of a tire placed over the rim and links and prevent thereby the lateral displacement of the tire.

An actuating disk 95 is pivoted to disk 87 by a bolt 96 extending coaxially through disks 87 and 95. A series of arcuate levers 97 are pivoted at one of their ends, respectively, at equi-spaced points adjacent the periphery of the disk 95 by suitable means; the opposite ends of the levers 97 are pivoted to laterally-projecting extensions 98 of links 92, respectively. It will be observed that by turning disk 95 on pivot bolt 96 the point of pivoting of the levers 97 to said disk may be moved toward or away from radial lines of the disk which, if extended, pass through the respective link extensions 98 so as to swing the centering members outwardly or inwardly of rim 85. The disk 95 is operated in the manner described by manipulation of a pair of knurled clamping nuts 99 threaded on the ends of square-shanked bolts 100 extending through disks 87 and 95 at diametrically opposite sides of the pivot bolt 96. The shanks of the bolts operate in arcuate slots 101 formed in disk 87 which have a common center on the axis of the pivot bolt 96. The disk 95 is turned on its axis by manually swinging the nuts 99 arcuately in the circle in which they are both disposed, opposite ends of the slots 101 limiting this movement of the outer disk to positions in which the centering members will be fully retracted and fully extended, respectively. The centering members may be held in any adjusted position by threading the nuts 99 or either of them tightly down on disk 95 so as to clamp the latter into frictional engagement with the non-rotating disk 87.

To aid in effecting the tire-centering operation a flat coil spring 102 is disposed in an annular housing 103 formed between the disks 87 and 95 by complementary and registering recesses in the abutting faces of said disks. One end of the spring 102 is secured to disk 87 and the opposite end thereof is secured to the outer disk 95 so as to urge the latter rotatably in a counterclockwise direction causing the outward movement of the centering members 90.

The tire 104 to be buffed is prepared for mounting on rim 85 by placing a tube 105 therein. The tire 104 and tube are placed over the rim and the retracted centering members 90, and, while supporting the tire from beneath, the disk 95 is released to rotate in response to the expansive urge of spring 102, by the disengagement of the clamping nuts 99, thus causing the centering members to be thrown outwardly against the beads 94 of the tire for centering the same. The clamping nuts 99 are then threaded down to lock the centering members 90 in their extended position to maintain the coaxial relationship between the tire 104 and rim 85. The tube 105 is then inflated with five or ten pounds of air to cause it to bulge between the tire beads and the links 92 of the centering members 90 to reinforce the tire while buffing.

As above indicated, the tire 104 and the rim are free to rotate, the composite channel 77 forming a bearing for the rim. In order to lubricate this bearing a small tube 105a extends through a suitable radial opening in the pin intermediate the ends of the latter to communicate with the upper end of an axial bore 106 of the pin 73. The outer end of tube 105a protruding from the pin turns upwardly, whereby oil deposited in the tube will flow through the tube into bore 106, which opens at its lower end into the lower bearing 80. Each of the bearings 80 for the ends of pin 73 have small circular openings 107 therein communicating with channel 77. Oil entering the lower bearing 80 thus flows by gravity into the channel 77 for the lubrication thereof, being distributed by the rim 85 as the latter is rotated by means hereinafter described. Oil carried by the rotating rim 85 to the upper arc of channel 77 is deposited in an opening 108 communicating with the bearing 80 for the upper end of the pin 73. It will thus be seen that both the bearings 80 for the pin 73 and the channel 77 in which hub 74 turns may be lubricated efficiently by oil deposited in the tube 105a.

The rim 85 is rotated slowly, preferably in a direction opposite to the movement of the buffing elements 19 and 20, i. e., preferably in a clockwise direction, by means of a motor 111 mounted above arm 64 on brackets 112 connected by suitable means to the interior of hub 74. The shaft 113 of motor 111 carries a drive pulley 114 over which a V-shaped belt 115 is adapted to operate. A drum 116, secured at one edge to the side of rim 85 at which the motor 111 is mounted, flares outwardly below pulley 114 and is grooved to form a race 117 for belt 115. The diameter of pulley 114 is very much smaller than that of the belt race 117, whereby the rim 85 and tire 105 will be rotated, upon actuation of motor 111, at very slow speed.

As above indicated, it is desirable for most effective results that the movement of the tire at the side of hub 74 nearest adjacent the buffing element with respect to which it is arranged should be in the opposite direction to that of the buffer. To this end a reversing switch 118 is mounted on the top of motor 111 to control the circuit thereto and change the direction of rotation of the rim 85 and tire when the latter are swung from one buffing element to the other.

A tubular bearing 119 is secured to the underside of motor 111 with the bore thereof parallel to the tread of tire 104. A rod lever 120 extends slidably through the bearing 119, having its ends enlarged as at 121 to prevent inadvertent withdrawal of the lever from the bearing. By manipulation of the lever 120 the apparatus may be swung on its various pivots to present any part of the tire tread to either of the buffing elements in accordance with the operation of the apparatus as more in detail set forth below.

In Fig. 13 I have illustrated one of a plurality of auxiliary centering devices 122 which are adapted for utilization with the centering apparatus above described to adapt the apparatus for the buffing of large tires. Each of the auxiliary centering devices comprises a pair of parallel legs 123 connected by an integral transverse link 124 having diametric enlargements 125 at either end for the respective engagement of the beads of a tire. The legs 123 are considerably longer than the legs 91 of the centering members 90 and are provided with transversely aligned recesses 126 extending obliquely into the underedge thereof to accommodate the link 92 of a centering member 90 with which the respective auxiliary devices 122 are employed. The free ends of the legs 123 of centering devices 122 are adapted to be pivotally connected to the centering members 90, respectively, by pins 128, which are removably extended through the ends of legs 123 of each device and into openings 127 formed intermediate the ends of legs 91 of the centering member 90 with which it is adapted to be associated, whereby the partial rotation of disk 95 for effecting retraction or extension of the centering members 90 will correspondingly actuate the auxiliary devices 122, and thereby adapt the apparatus for centering and supporting tires having inside diameters greater and wider than the largest circle of operation of the centering members 90.

It will be observed that the apparatus provides for swinging the rim and tire, by manipulation of the rod lever 120, in arcs having their centers on the post 23, the pin 58, or on pin 73 at the end of the arm 64, respectively, and further that the length and radius of these arcs of movement on the post and on pin 58 may be varied by shifting block 42 on supporting frame 25, and the arm 64 longitudinally.

By swinging the pivot pin 58 throughout the arcuate area defined in its width by the limit of its sliding movement on the supporting frame 25 and in its length by the limit of arcuate movement on post 23, the pin 73 may be moved to either side of either of the buffing elements 19 or 20 where it is permitted a wide latitude of arcuate motion around pin 58 to vary the center of the arc of movement of the periphery of the tire on pin 73. The tire 104 may thus be shifted to bring either side wall or center tread against either of the buffing elements. For example, by swinging the supporting frame 25 as far to the right as possible and swinging the rim 85 and tire 104 to its extreme counterclockwise position, the lowest annular area on the right side wall of a tire may be reached by the rasp 19. With the apparatus thus adjusted, the arm 64 is extended to bring the tire into an arc of movement thereof on pivot pin 58 in which the rasp is disposed whereupon the tire may be swung on said pivot into contact with the rasp. Adjustment of the extension of the arm through the operation of the pinion 67, relative to the position of the pivot 58 on the supporting frame may be made to compensate for variations in diameters of the tires to be buffed. If several tires are to be similarly buffed the proper adjustment of the apparatus on the pivots 23 and 73 once determined may be maintained by securing frame 25 against movement on the pivot post 23 through clamping engagement of the split collar 31 with collar 29, actuated by rotation of rod 35, and similarly clamping the plate 81 carried by the pivoted hub 74 to arm 64 by threading the winged nut 84 down on the plate, the arm being permitted to swing freely on pivot pin 58 to permit movement of the tire from the rasp 19 for its removal from the rim 85 and the placement of another tire thereon.

The manner of positioning the tire with the left side wall against the rasp, will be apparent from the above description of the mechanical expedients and their operation; it will suffice to point out that while rasping the right side wall, as above described, the supporting frame 25 is moved to its extreme right position, in which case the pivot pin 58 is the center of the arc of movement of the tire against the rasp for determining the depth of the buff, whereas, when the left side wall is buffed, the movement of the tire into and from the rasp will preferably be in an arc having its center on the pivot post 23.

It will be observed that the manipulation of the apparatus with respect to the brush 20 will be simply the reverse of that described above for rasping the tire, it being an important feature hereof that when the supporting frame 25 and arm 64 are in the middle of their range of arcuate movement, the pivots 58 and 73 will be disposed in a plane parallel to and equi-spaced between the buffing elements whereby an area of a tire rasped may be swung to exactly the same position with respect to the brush by the simple operation of positioning each section of the jointed apparatus at the opposite side of its central position in its arc of movement from, and to the same degree as, its position with respect to the middle of its range of movement when adjusted for rasping.

While I have described but one embodiment of my invention, it will be understood that various changes in design, size, shape and proportion of the various parts may be made, without departing from the scope of my invention, as defined by the appended claims.

What I claim and desire to secure by Letters Patent is:

1. In a tire buffing lathe, a pair of cylindrical members, means to connect said members together to form a composite circular track, a tire-mounting rotatably carried by said track, said members forming diametrically opposed bearings, an arm having a transverse pin connected thereto journalled in said bearings, the center of said track and the axis of said pin lying in the same plane.

2. In a tire buffing lathe, a pair of cylindrical members, means to connect said members together to form a composite circular track, a tire-mounting rotatably carried by said track, said members forming diametrically opposed bearings, an arm having a transverse pin connected thereto journalled in said bearings, said pin having a bore therethrough opening intermediate its ends and into one of said bearings for the flow of oil, said last-named bearing being communicated with said track.

3. In a tire buffing lathe, a bar, means to mount said bar, an arm, means to pivotally connect said bar and arm together including means comprising a pair of members slidably associated with said bar and arm respectively, a tire mounting for the rotatable support of the tire to be buffed, means to pivotally connect said tire mounting to said arm, a handle to swing said tire mounting on said last-named means, and means to rotate said tire mounting.

4. In a tire buffing lathe, a standard, a bar, means to pivotally connect said bar to said standard, an arm, means to pivotally connect said bar and arm together including means comprising a pair of members slidably associated with said bar and arm respectively, and means to shift said arm laterally and longitudinally with respect to said bar.

5. In a tire buffing lathe, a standard, a bar, means to pivotally connect said bar to said standard, an arm, means to pivotally connect said bar and arm together including means comprising a pair of members slidably associated with said bar and arm respectively, means to shift said arm laterally and longitudinally with respect to said bar, means to secure said bar against pivoting on said standard, and means to secure said arm against pivoting on said bar.

6. In a device of the character described, a rim, a tire hub within said rim and upon which hub said rim is adapted to rotate, an upper and a lower bearing in said hub, said hub having a radial opening therein communicating with its outer bearing surface, means to direct oil into the lower bearing, and a spindle journalled in said radial opening for the pivotal support of said hub.

7. An expansible tire-supporting wheel, comprising a pair of circular members concentrically pivoted for limited relative rotatable movement, a series of equi-spaced levers, each pivoted at one of its ends adjacent the periphery of one of said circular members, a series of tire centering members, each comprising a link and a pair of legs, each of said links being connected at opposite ends to one of each of said legs, said respective pairs of legs being pivotally connected in equi-spaced relation to each other adjacent the periphery of the other of said circular members, means for limited relative rotation of said circular members, and spring means adapted to urge limited relative rotation of said circular members in one direction.

ARTHUR R. OAKES.